(12) United States Patent
Maeji

(10) Patent No.: US 8,427,299 B2
(45) Date of Patent: Apr. 23, 2013

(54) ALARM PROCESSING CIRCUIT AND ALARM PROCESSING METHOD

(75) Inventor: Naoki Maeji, Tokyo (JP)

(73) Assignee: NEC Corporation, Tokyo (JP)

( * ) Notice: Subject to any disclaimer, the term of this patent is extended or adjusted under 35 U.S.C. 154(b) by 556 days.

(21) Appl. No.: 12/633,957

(22) Filed: Dec. 9, 2009

(65) Prior Publication Data

US 2010/0164708 A1 Jul. 1, 2010

(30) Foreign Application Priority Data

Dec. 16, 2008 (JP) ................................ 2008-319157

(51) Int. Cl.
G08B 19/00 (2006.01)

(52) U.S. Cl.
USPC ............ 340/521; 340/517; 340/501; 340/500

(58) Field of Classification Search .................... 340/521
See application file for complete search history.

(56) References Cited

U.S. PATENT DOCUMENTS

| 5,581,242 | A  | * | 12/1996 | Arita et al. ................. | 340/691.6 |
| 6,535,122 | B1 | * | 3/2003  | Bristol ........................ | 340/506 |
| 6,631,363 | B1 | * | 10/2003 | Brown et al. ................. | 719/318 |
| 7,692,537 | B2 | * | 4/2010  | Skold et al. .................. | 340/506 |
| 2007/0001806 | A1 | * | 1/2007 | Poll .............................. | 340/7.59 |

FOREIGN PATENT DOCUMENTS

| JP | 8-70290 A    | 3/1996  |
| JP | H08256172 A  | 10/1996 |
| JP | H08298533 A  | 11/1996 |
| JP | H09116517 A  | 5/1997  |
| JP | H09282245 A  | 10/1997 |
| JP | H10304016 A  | 11/1998 |

OTHER PUBLICATIONS

Japanese Office Action for JP2008-319157 mailed on Nov. 13, 2012.

* cited by examiner

*Primary Examiner* — Kerri McNally

(57) ABSTRACT

An alarm processing circuit includes a primary mask processing unit that performs primary mask processing on an alarm signal based on a first condition; and a secondary mask processing unit that performs secondary mask processing on the alarm signal based on a second condition and a mask processing result by the primary mask processing unit, the second condition being different from the first condition.

18 Claims, 13 Drawing Sheets

| DATA FORMAT | | ITEM NAME | MEANING/USAGE |
|---|---|---|---|
| MASK COMPONENT | VALUE | | |
| 0 | (**) | mask_cond-1 | SET VALUE A==1 AND SET VALUE B==0 |
| 1 | (**) | mask_cond-2 | SET VALUE A==1 AND SET VALUE C==0 |
| 2 | (**) | mask_cond-3 | SET VALUE D==1 |
| 3 | (**) | mask_cond-4 | SET VALUE E==1 |

Fig. 3

| DATA FORMAT | | MEANING/USAGE | | |
|---|---|---|---|---|
| MAIN SIGNAL COMPONENT | ACQUIRED VALUE | ITEM NAME | READ ADDRESS | BIT VALUE |
| 0 | (*) | preALM-1 | 0x0850 | 1 |
| 1 | (*) | preALM-2 | 0x0850 | 0 |
| 2 | (*) | preALM-3 | 0x086E | 15 |
| 3 | (*) | preALM-4 | 0x0850 | 3 |
| 4 | (*) | preALM-5 | 0x0850 | 5 |
| 5 | | preALM-6 | 0x1C96 | 0 |

Fig. 4

| ALARM SOURCE COMPONENT | DATA FORMAT | MEANING/USAGE | |
|---|---|---|---|
| | GENERATED VALUE | ITEM NAME | PRE-ALARM PROCESSING |
| 0 | SAME VALUE AS preALM_1 | ALM-1 | NO |
| 1 | SAME VALUE AS preALM_2 | ALM-2 | NO |
| 2 | SAME VALUE AS preALM_3 | ALM-3 | NO |
| 3 | SAME VALUE AS preALM_4 | ALM-4 | NO |
| 4 | SAME VALUE AS preALM_5 | ALM-5 | NO |
| 5 | SAME VALUE AS preALM_6 | ALM-6 | NO |
| 6 | VALUE GENERATED BY DETECTION PROCESSING-6 | ALM-7 | DETECTION PROCESSING-6 |

| | mask_cond-1 | mask_cond-2 | mask_cond-3 | mask_cond-4 |
|---|---|---|---|---|
| ALM-1 | 1 | 1 | 0 | 0 |
| ALM-2 | 1 | 1 | 0 | 0 |
| ALM-3 | 1 | 1 | 0 | 1 |
| ALM-4 | 1 | 1 | 0 | 0 |
| ALM-5 | 1 | 1 | 0 | 0 |
| ALM-6 | 0 | 0 | 0 | 0 |
| ALM-7 | 1 | 1 | 1 | 0 |

Fig. 7

| DATA FORMAT | MEANING/USAGE |
|---|---|
| PRIMARY ALARM COMPONENT | ITEM NAME |
| 0 | dALM-1 |
| 1 | dALM-2 |
| 2 | dALM-3 |
| 3 | dALM-4 |
| 4 | dALM-5 |
| 5 | dALM-6 |
| 6 | dALM-7 |

|  | ALM-1 | ALM-2 | ALM-3 | ALM-4 |
|---|---|---|---|---|
| ALM-1 | 0 | 0 | 0 | 0 |
| ALM-2 | 1 | 0 | 0 | 0 |
| ALM-3 | 1 | 1 | 0 | 0 |
| ALM-4 | 1 | 1 | 1 | 0 |
| ALM-5 | 1 | 1 | 1 | 1 |
| ALM-6 | 1 | 1 | 1 | 1 |
| ALM-7 | 1 | 1 | 1 | 1 |

| DATA FORMAT | MEANING/USAGE |
|---|---|
| DEFINED ALARM COMPONENT | ITEM NAME |
| 0 | cALM-1 |
| 1 | cALM-2 |
| 2 | cALM-3 |
| 3 | cALM-4 |
| 4 | cALM-5 |
| 5 | cALM-6 |
| 6 | cALM-7 |

Fig. 14

| DATA FORMAT | | MEANING/USAGE |
|---|---|---|
| ALARM MASK COMPONENT | VALUE | ITEM NAME |
| 0 | (***) | ddALM-1 |
| 1 | (***) | ddALM-2 |
| 2 | (***) | ddALM-3 |
| 3 | (***) | ddALM-4 |
| 4 | (***) | ddALM-5 |
| 5 | (***) | ddALM-6 |
| 6 | (***) | ddALM-7 |

Fig. 15

| DATA FORMAT | MEANING/USAGE |
|---|---|
| DEFINED ALARM COMPONENT | ITEM NAME |
| 0 | cALM-1 |
| 1 | cALM-2 |
| 2 | cALM-3 |
| 3 | cALM-4 |
| 4 | cALM-5 |
| 5 | cALM-6 |
| 6 | cALM-7 |

ALARM PROCESSING CIRCUIT AND ALARM PROCESSING METHOD

INCORPORATION BY REFERENCE

This application is based upon and claims the benefit of priority from Japanese patent application No. 2008-319157, filed on Dec. 16, 2008, the disclosure of which is incorporated herein in its entirety by reference.

BACKGROUND OF THE INVENTION

1. Technical Field

The present invention relates to an alarm processing circuit and an alarm processing method, and more specifically, to an alarm processing circuit and an alarm processing method in a communication device.

2. Background Art

A communication device typically includes an alarm processing circuit. The alarm processing circuit judges presence or absence of a fault based on a signal (hereinafter referred to as main signal) input to the communication device to perform processing of outputting an alarm signal. More specifically, the alarm processing circuit generates an alarm signal upon judgment that the fault has occurred. However, the processing efficiency may be degraded if the alarm processing circuit outputs the alarm signal every time the judgment is made that the fault has occurred. Accordingly, it is required to perform mask processing on a specific alarm signal in the alarm processing based on setting information of the communication device.

Further, the alarm processing circuit in the communication device generates alarm signals that have a relation with the communication structure or the hardware structure of the communication device. The mask processing needs to be executed on an alarm signal (hereinafter referred to as secondary alarm signal) other than the alarm signal that warns of the cause of the fault (hereinafter referred to as cause alarm signal) among these alarm signals. More specifically, the alarm processing circuit performs the mask processing on the secondary alarm signal based on the cause alarm signal. Thus, the alarm processing circuit is able to output only the cause alarm signal.

In general, a dozen to several dozens of alarm signals are defined for each communication line as the alarm signals that are generated based on the main signal. These alarm signals are divided into the cause alarm signal and the secondary alarm signal.

A transmission device disclosed in Japanese Unexamined Patent Application Publication No. 08-070290 stores state information indicating a state of each path or each line in the transmission device. Further, state information that is input (present state information) is compared with state information that is stored (previous state information). When the previous state information and the present state information are different from each other, it is judged that the state of each path or line in the transmission device has changed. Then, the fault that causes this change is detected and stored. Further, a secondary mask pattern is generated based on the fault. Then, the mask processing is performed on the secondary alarm signal using the secondary mask pattern.

However, according to the above-described alarm processing, the secondary alarm signal is subjected to the mask processing based on the cause alarm signal, and thus, the mask processing performed on one alarm signal gives an influence on the generation condition of other alarm signals. It is thus difficult to perform maintenance such as design specification.

Further, the processing time to perform the mask processing on the secondary alarm signal based on the cause alarm signal exponentially increases with respect to the number of alarm signals. For example, if the number of alarm signals is doubled, the mask processing of up to four times (2×2 times) is required. Further, the number of alarm signals that is generated is also increased in accordance with the increased number of signals that are treated in the communication device. As such, the mask processing in the alarm processing is one of the factors to inhibit the high performance of the communication device.

In the transmission device disclosed in Japanese Unexamined Patent Application Publication No. 08-070290, when there is no difference between the previous state information and the present state information, further processing is stopped to shorten the processing time. However, according to the transmission device disclosed in Japanese Unexamined Patent Application Publication No. 08-070290, some systems are required such as a comparator that compares the previous state information with the present state information and software that realizes the comparing. Further, as it takes time to perform the comparison, the processing time of the whole alarm processing can hardly be shortened.

Furthermore, in the communication device, the alarm processing is often realized by software. Accordingly, the processing result of the alarm processing depends on the order of the alarm processing. More specifically, each alarm signal is sequentially generated in the software processing. Thus, the final mask processing result may be different depending on the order of the alarm processing. For example, assume a case in which there are two piles that "mask processing is performed on an alarm signal B based on an alarm signal A" and "mask processing is performed on an alarm signal C based on the alarm signal B". In such a case, as the alarm signal B has already been subjected to the mask processing when the first rule is performed first, the second rule is not performed. Thus, the alarm signal C is not subjected to the mask processing. On the other hand, when the second rule is performed first, the alarm signal C is subjected to the mask processing first. Then, the first rule is executed, and thus the alarm signal B is also subjected to the mask processing. As such, the final mask processing result is different depending on at which time and which alarm signal is subjected to the mask processing. Accordingly, it is difficult to make clear the range that is influenced by the change in changing the mask relation in the maintenance of the design specification or the like.

This problem can be avoided by creating special mask processing for each alarm signal. However, the increase of the number of alarm signals leads to the increase of the number of the special mask processing. Thus, the mask processing in the alarm processing degrades the performance of the communication device.

Further, it should be considered at which timing of the alarm processing and how the mask processing should be performed, or to what extent the alarm signal that is used for the mask processing is processed. Thus, the relation between the alarm signals becomes complicated. Thus, if the number of alarm signals increases, the maintenance of the change to the specification or the like becomes significantly difficult compared with the increased amount of the alarm signals.

SUMMARY

An exemplary object of the present invention is to provide an alarm processing circuit and an alarm processing method that are capable of performing change to the specification in a simpler way and obtaining more accurate processing result.

An exemplary aspect of the present invention is an alarm processing circuit including a primary mask processing unit that performs primary mask processing on an alarm signal based on a first condition, and a secondary mask processing unit that performs secondary mask processing on the alarm signal based on a second condition and a mask processing result by the primary mask processing unit, the second condition being different from the first condition.

Another exemplary aspect of the present invention is an alarm processing method including performing primary mask processing on an alarm signal based on a first condition, and performing secondary mask processing on the alarm signal based on a second condition and a mask processing result by the primary mask processing, the second condition being different from the first condition.

According to the present invention, it is possible to provide the alarm processing circuit and the alarm processing method that are capable of performing change to the specification in a simpler way and obtaining more accurate processing result.

BRIEF DESCRIPTION OF THE DRAWINGS

The above and other aspects, features, and advantages of the present invention will become more apparent from the following description of certain exemplary embodiments when taken in conjunction with the accompanying drawings, in which:

FIG. 3 is a diagram showing one example of data structure of mask setting information according to the present invention;

FIG. 4 is a diagram showing one example of data structure of main signal information according to the present invention;

FIG. 5 is a diagram showing one example of data structure of alarm source information according to the present invention;

FIG. 6 is a diagram showing one example of data structure of a primary mask table according to the present invention;

FIG. 7 is a diagram showing one example of data structure of primary masked alarm information according to the present invention;

FIG. 14 is a diagram showing one example of data structure of alarm mask information according to the second exemplary embodiment of the present invention;

FIG. 15 is a diagram showing one example of data structure of defined alarm information according to the second exemplary embodiment of the present invention.

EXEMPLARY EMBODIMENT

Hereinafter, the exemplary embodiments to which the present invention can be applied will be described. Note that the present invention is not limited to the exemplary embodiments described below.

First Exemplary Embodiment

Figure 1:
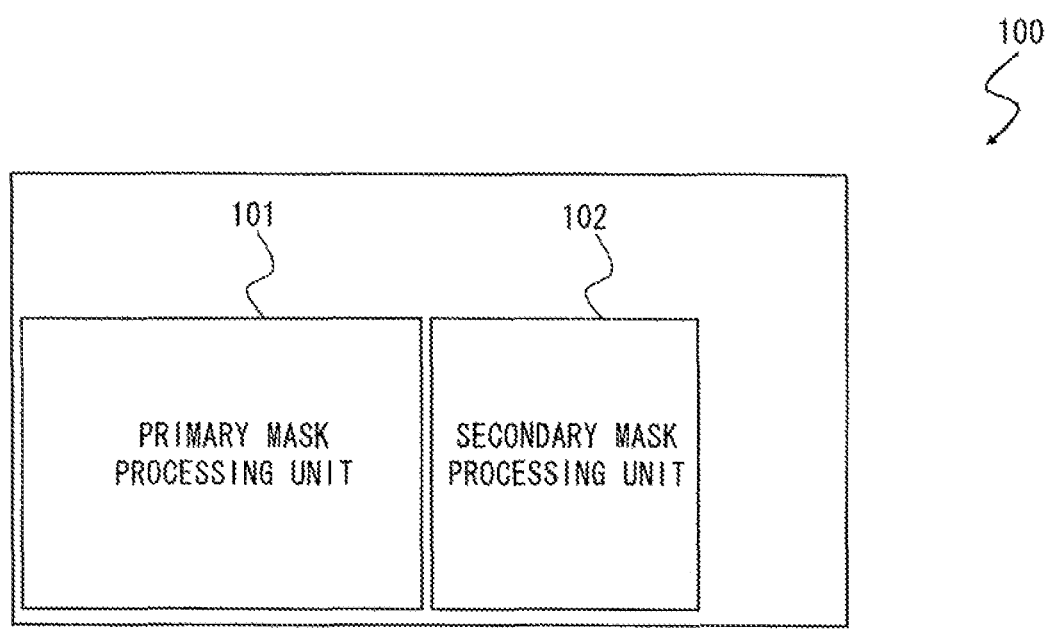
FIG. 1 is a block diagram showing an alarm processing circuit according to the present invention.

An alarm processing circuit 100 according to the first exemplary embodiment of the present invention will be described with reference to the drawings. The alarm processing circuit 100 includes, as shown in FIG. 1, a primary mask processing unit 101 and a secondary mask processing unit 102.

The primary mask processing unit 101 mainly performs primary mask processing of an alarm signal based on a first condition. Further, the secondary mask processing unit 102 mainly performs secondary mask processing based on the processing result in the primary mask processing unit 101 and a second condition.

In short, according to the first exemplary embodiment, the mask processing is separately performed as the primary mask processing and the secondary mask processing.

Now, the first condition includes mask setting information and a primary mask table that will be described below. The second condition includes a secondary mask table that will be described below.

Figure 2:
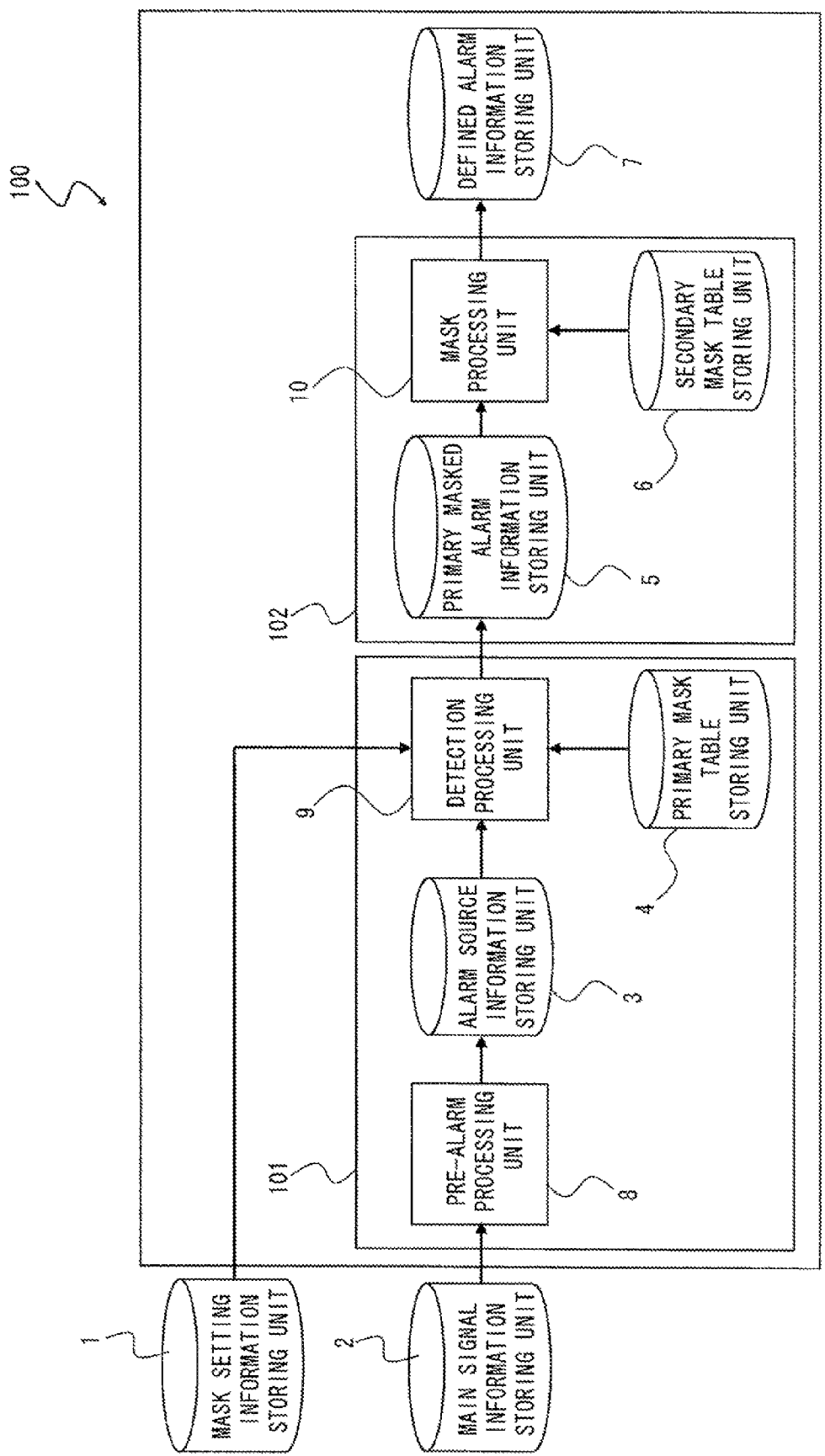
FIG. 2 is a block diagram showing one example of the alarm processing circuit according to a first exemplary embodiment of the present invention.

Further, FIG. 2 shows one example of the alarm processing circuit 100 according to the first exemplary embodiment of the present invention. As shown in FIG. 2, the alarm processing circuit 100 includes a defined alarm information storing unit 7 in addition to the primary mask processing unit 101 and the secondary mask processing unit 102.

Further, the primary mask processing unit 101 is connected to a mask setting information storing unit 1 and a main signal information storing unit 2.

Furthermore, the primary mask processing unit 101 includes an alarm source information storing unit 3, a primary mask table storing unit 4, a pre-alarm processing unit 8, and a detection processing unit 9. The primary mask processing in the primary mask processing unit 101 includes pre-alarm processing by the pre-alarm processing unit 8 and detection processing by the detection processing unit 9.

The secondary mask processing unit 102 includes a primary masked alarm information storing unit 5, a secondary mask table storing unit 6, and a mask processing unit 10. The secondary mask processing in the secondary mask processing unit 102 includes mask processing by the mask processing unit 10.

Further, the detection processing unit 9 in the primary mask processing unit 101 and the primary masked alarm information storing unit 5 in the secondary mask processing unit 102 are connected together.

The alarm processing circuit 100 further includes a computer (not shown) or the like that includes a CPU (Central Processing Unit; not shown) or the like. The CPU executes a program for implementing various functions of the alarm processing circuit 100 so that the various functions of the alarm processing circuit 100 are operated. More specifically, the CPU executes an alarm processing program so as to function as the pre-alarm processing unit 8, the detection processing unit 9, and the mask processing unit 10.

The alarm processing circuit 100 further includes a memory (not shown) or the like. The memory functions as the alarm source information storing unit 3, the primary mask table storing unit 4, the primary masked alarm information storing unit 5, the secondary mask table storing unit 6, and the defined alarm information storing unit 7.

Note that the alarm processing circuit 100 may be formed by a rewritable FPGA (Field Programmable Logic Device).

The mask setting information storing unit 1 stores mask setting information. The mask setting information is the information indicating whether the alarm signal is subjected to the mask processing in an alarm mask condition. Further, the alarm mask condition is the condition that is defined as the setting of the device in which the alarm processing circuit 100 is mounted.

More specifically, the mask setting information storing unit 1 stores the alarm mask condition and the information indicating whether the alarm signal is subjected to the mask processing under this alarm mask condition by making them correspondent to each other. FIG. 3 shows the data structure of the mask setting information. As shown in FIG. 3, the mask setting information storing unit 1 stores a data format and a meaning/usage by making them correspondent to each other. Further, the mask setting information storing unit 1 stores a mask component 1A and a value 1B by making them correspondent to each other as the data format. Further, the mask setting information storing unit 1 stores an item name 1C and a generation condition 1D by making them correspondent to each other as the meaning/usage. In other words, the mask setting information storing unit 1 stores the mask component 1A, the value 1B, the item name 1C, and the generation condition 1D by making them correspondent to each other.

Now, the item name 1C indicates the name of the alarm mask condition. Further, the generation condition 1D indicates the content of the alarm mask condition. Further, the value 1B indicates whether the alarm signal is subjected to the mask processing in the corresponding alarm mask condition (defined by the item name 1C and the generation condition 1D). More specifically, the value 1B indicates the mask execution when the value 1B is "1", and indicates the mask non-execution when the value 1B is "0".

The main signal information storing unit 2 stores main signal information. The main signal information is the information indicating the main signal state and various information in the device where the alarm processing circuit 100 is mounted.

FIG. 4 shows the data structure of the main signal information. As shown in FIG. 4, the main signal information storing unit 2 stores the data format and the meaning/usage by making them correspondent to each other. Further, the main signal information storing unit 2 stores a main signal component 2A and an acquired value 2B by making them correspondent to each other as the data format. Further, the main signal information storing unit 2 stores an item name 2C, ReadAddress2D, and a bit value 2E by making them correspondent to each other as the meaning/usage. In other words, the main signal information storing unit 2 stores the main signal component 2A, the acquired value 2B, the item name 2C, ReadAddress2D, and the bit value 2E by making them correspondent to each other.

Now, the item name 2C indicates the type of the main signal information. Further, ReadAddress2D indicates the address of the memory where the main signal information or the information regarding the main signal information is stored. Further, the bit value 2E indicates the bit value of the information stored in the address shown in ReadAddress2D. Further, the acquired value 2B is the value based on the bit value of the information stored in the address shown in ReadAddress2D. Note that the acquired value 2B, ReadAddress2D, and the bit value 2E are not limited to those of the first exemplary embodiment, but may be different for every aspect in which the alarm processing circuit 100 is employed.

The alarm source information storing unit 3 stores the alarm source information. The alarm source information is the information which is the source of the alarm signal. More specifically, the alarm source information is the information indicating the presence or absence of the occurrence of each alarm signal.

More specifically, the alarm source information storing unit 3 stores each alarm signal and the presence or absence of the occurrence of each alarm signal by making them correspondent to each other. FIG. 5 shows the data structure of the alarm source information. As shown in FIG. 5, the alarm source information storing unit 3 stores the data format and the meaning/usage by making them correspondent to each other. Further, the alarm source information storing unit 3 stores an alarm source component 3A and a generated value 3B by making them correspondent to each other as the data format. Further, the alarm source information storing unit 3 stores an item name 3C and pre-alarm processing 3D by making them correspondent to each other as the meaning/usage. In other words, the alarm source information storing unit 3 stores the alarm source component 3A, the generated value 3B, the item name 3C, and the pre-alarm processing 3D by making them correspondent to each other.

Now, the item name 3C shows the type of each alarm signal. Further, the pre-alarm processing 3D indicates the type of the detection processing in which each alarm signal is detected, and the presence or absence of the detection processing. For example, as shown in FIG. 5, the alarm signals of "ALM-1", "ALM-2", . . . "ALM-6" are the alarm signals that are defined by the main signal information stored in the main signal information storing unit 2. As such, the pre-alarm processing 3D of "ALM-1", "ALM-2", . . . "ALM-6" is indicated as "no".

On the other hand, the alarm signal of "ALM-7" is the alarm signal that is detected by "detection processing$^{-6}$". Thus, the pre-alarm processing 3D of "ALM-7" is indicated as "detection processing$^{-6}$". Further, the generated value 3B indicates the presence or absence of the occurrence of each alarm signal. More specifically, when the alarm signal is defined by the main signal information, the generated value 3B of the alarm signal is the same value as the acquired value 2B of the main signal information. Further, when the alarm signal is detected by other detection processing ("detection processing$^{-6}$", for example), the generated value 3B of the alarm signal is the value that is generated by the detection processing.

The primary mask table storing unit 4 stores the primary mask table. FIG. 6 shows the data structure of the primary mask table stored in the primary mask table storing unit 4. As shown in FIG. 6, the primary mask table includes matrix data. The type of the alarm signal which is subjected to the mask processing is shown in the row direction (vertical direction), and the item name 1C (name of the alarm mask condition) of the mask setting information is shown in the column direction (lateral direction). The information whether each alarm signal is subjected to the mask processing in each alarm mask condition is stored as the matrix data. More specifically, the information whether the alarm signal of the i-th row is subjected to the mask processing in the alarm mask condition of the j-th column is stored as the value of the i-th row and j-th column. More specifically, the value of the i-th row and j-th column of "1" indicates that the alarm signal of the i-th row is subjected to the mask processing in the alarm mask condition of the j-th column. Further, the value of the i-th row and j-th column of "0" indicates that the alarm signal of the i-th row is not subjected to the mask processing in the alarm mask condition of the j-th column.

Note that each of i and j is an integer of 0 or more.

The primary masked alarm information storing unit 5 stores the primary masked alarm information. The primary masked alarm information is the information indicating the presence or absence of the occurrence of each alarm signal after the detection processing by the detection processing unit 9. FIG. 7 shows the data structure of the primary masked alarm information. As shown in FIG. 7, the primary masked alarm information storing unit 5 stores the data format and the meaning/usage by making them correspondent to each other. Further, the primary masked alarm information storing unit 5 stores a primary alarm component 5A as the data format. Further, the primary masked alarm information storing unit 5 stores an item name 5B as the meaning/usage. In other words, the primary masked alarm information storing unit 5 stores the primary alarm component 5A and the item name 5B by making them correspondent to each other.

Now, the primary alarm component 5A corresponds to the alarm source component 3A of the alarm source information. In other words, the primary alarm component 5A indicates the type of the alarm signal that is indicated in the item name 3C of the alarm source component 3A that corresponds to the primary alarm component 5A. In summary, the primary alarm component 5A indicates the type of the alarm signal. The item name 5B indicates the presence or absence of the occurrence of each alarm signal after the detection processing. More specifically, the item name 5B indicates the occurrence of the alarm signal indicated by the primary alarm component 5A when the value of the item name 5B is "1". Further, the item name 5B indicates that the alarm signal indicated by the primary alarm component 5A is not occurred when the value of the item name 5B is "0".

The value of the item name 5B is the value that is generated by the detection processing by the detection processing unit 9.

Figures 8, 9:
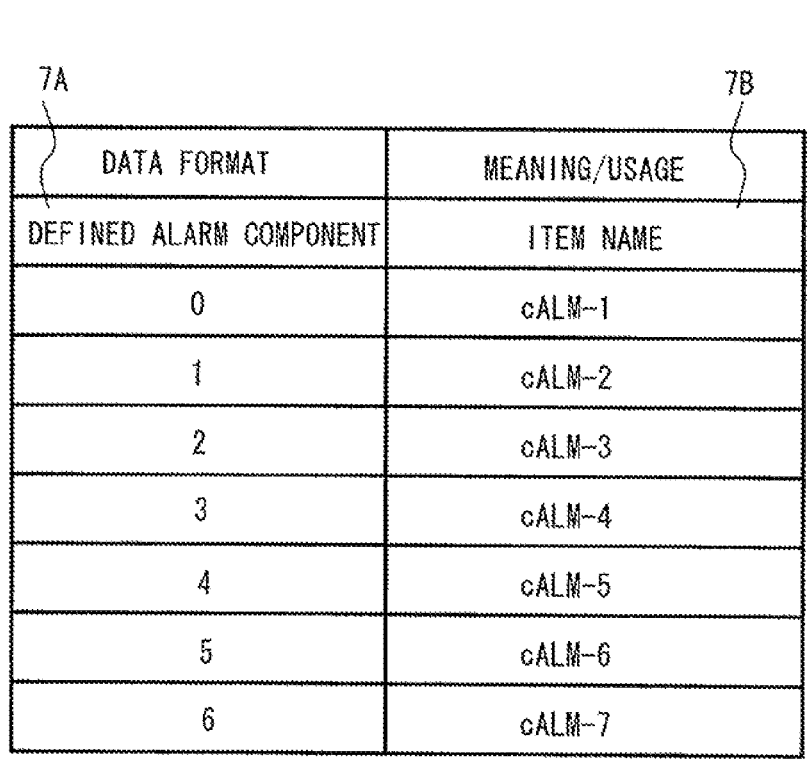
FIG. 8 is a diagram showing one example of data structure of a secondary mask table according to the present invention.
FIG. 9 is a diagram showing one example of data structure of defined alarm information according to the first exemplary embodiment of the present invention.

The secondary mask table storing unit 6 stores the secondary mask table. FIG. 8 shows the data structure of the secondary mask table stored in the secondary mask table storing unit 6. As shown in FIG. 8, the secondary mask table includes matrix data. The type of the alarm signal that is subjected to the mask processing is shown in the row direction (vertical direction), and the type of the alarm signal that performs the mask processing on the alarm signal is shown in the column direction (lateral direction). Then, the information whether each alarm signal is subjected to the mask processing by other alarm signals is stored as the matrix data. More specifically, the information whether the alarm signal of the i-th row is subjected to the mask processing in the alarm signal of the k-th column is stored as the value of the i-th row and k-th column. More specifically, the value of the i-th row and k-th column of "1" indicates that the alarm signal of the i-th row is subjected to the mask processing by the alarm signal of the k-th column. Further, the value of the i-th row and k-th column of "0" indicates that the alarm signal of the i-th row is not subjected to the mask processing by the alarm signal of the k-th column.

Note that each of i and k is an integer of 0 or more.

The defined alarm information storing unit 7 stores defined alarm information. The defined alarm information is the information indicating the presence or absence of the occurrence of each alarm signal after the mask processing by the mask processing unit 10. FIG. 9 shows the data structure of the defined alarm information. As shown in FIG. 9, the defined alarm information storing unit 7 stores the data format and the meaning/usage by making them correspondent to each other. Further, the defined alarm information storing unit 7 stores a defined alarm component 7A as the data format. Further, the defined alarm information storing unit 7 stores an item name 7B as the meaning/usage. In other words, the defined alarm information storing unit 7 stores the defined alarm component 7A and the item name 7B by making them correspondent to each other.

Now, the defined alarm component 7A corresponds to the primary alarm component 5A of the primary masked alarm information. In other words, the defined alarm component 7A indicates the type of the alarm signal that is shown in the primary alarm component 5A that corresponds to the defined alarm component 7A. In summary, the defined alarm component 7A indicates the type of the alarm signal. The item name 7B indicates the presence or absence of the occurrence of each alarm signal after the mask processing. More specifically, the item name 7B indicates the occurrence of the alarm signal shown in the defined alarm component 7A when the value of the item name 7B is "1". Further, the item name 7B indicates that the alarm signal shown in the defined alarm component 7A is not occurred when the value of the item name 7B is "0".

Further, the value of the item name 7B is the value generated by the mask processing by the mask processing unit 10.

The pre-alarm processing unit 8 generates the alarm source information based on the main signal information and stores the alarm source information in the alarm source information storing unit 3. Further, the pre-alarm processing unit 8 executes the alarm generation processing which is predetermined, and generates the alarm source information such as the generated value 3B, the item name 3C, and the pre-alarm processing 3D for each alarm source component 3A of the alarm source information. Now, the alarm generation processing which is predetermined is the processing which is determined in advance for each device where the alarm processing circuit 100 is mounted, which is the processing required to generate the alarm signal.

More specifically, the pre-alarm processing unit 8 generates the item name 3C of the alarm source information based on the item name 2C of the main signal information. Further, the pre-alarm processing unit 8 generates the generated value 3B of the alarm source information based on the acquired value 2B of the main signal information. Further, as there is no pre-alarm processing when the alarm signal is defined by the main signal information, the pre-alarm processing unit 8 generates the information of "no" as the pre-alarm processing 3D of the alarm source information.

For example, the pre-alarm processing unit 8 generates "ALM-1" as the item name 3C of "0" of the alarm source component 3A shown in FIG. 5 based on "preALM-1" of the item name 2C of "0" of the main signal component 2A shown in FIG. 4. Further, the pre-alarm processing unit 8 generates the generated value 3B of "0" of the alarm source component 3A shown in FIG. 5 based on the acquired value 2B of "0" of the main signal component 2A shown in FIG. 4. As the generated value 3B of "0" of the alarm source component 3A is "same value as preALM-1" in FIG. 5, the pre-alarm processing unit 8 generates the same value as the acquired value 2B of "0" of the main signal component 2A as the generated value 3B of "0" of the alarm source component 3A.

The pre-alarm processing unit 8 further generates the alarm source information regarding the fault which is not based on the main signal information. In other words, the pre-alarm processing unit 8 also generates the alarm source information regarding the alarm signal detected by other detection processing, and stores the alarm source information in the alarm source information storing unit 3.

More specifically, the pre-alarm processing unit 8 generates a new item name 3C when the alarm signal is detected by the other detection processing. Further, the pre-alarm processing unit 8 generates the same value as the value generated by the other detection processing as the generated value 3B when the alarm signal is detected by the other detection processing. Further, the pre-alarm processing unit 8 generates the name of the other detection processing as the pre-alarm processing 3D when the alarm signal is detected by the other detection processing.

For example, when the alarm signal is generated by other detection processing "detection processing$^{-6}$", the pre-alarm processing unit 8 generates "ALM-7" as the item name 3C of "6" of the alarm source component 3A shown in FIG. 5. Further, the pre-alarm processing unit 8 generates "detection processing$^{-6}$" as the pre-alarm processing 3D.

The detection processing unit 9 generates the primary masked alarm information based on the alarm source information, the mask setting information, and the primary mask table, and stores the primary masked alarm information in the primary masked alarm information storing unit 5.

More specifically, the detection processing unit 9 generates the value indicating the presence or absence of the occurrence of each alarm signal based on the alarm source information, the mask setting information, and the primary mask table, and stores the generated value in the primary masked alarm information storing unit 5 as the item name 5B. For example, the detection processing unit 9 generates "1" as the item name 5B of the primary alarm component 5A indicating the alarm signal upon judgment that the alarm signal is occurred. Further, the detection processing unit 9 generates "0" as the item name 5B of the primary alarm component 5A indicating the alarm signal upon judgment that the alarm signal is not occurred.

More specifically, the detection processing unit 9 firstly stores the generated value 3B of "0" of the alarm source component 3A of the alarm source information in the primary masked alarm information storing unit 5 as the item name 5B of "0" of the primary alarm component 5A (hereinafter referred to as dALM-1).

Next, the detection processing unit 9 calculates AND condition between the value of the 0-th row and 0-th column in the primary mask table and the value 1B of "0" of the mask component 1A of the mask setting information.

Next, the detection processing unit 9 calculates AND condition between the negative of the AND condition and the value of dALM-1 and stores the result in dALM-1.

Next, the detection processing unit 9 calculates AND condition between the value of the 0-th row and 1-th column in the primary mask table and the value 1B of "1" of the mask component 1A of the mask setting information.

Next, the detection processing unit 9 calculates AND condition between the negative of the AND condition and the value of dALM-1 and stores the result in dALM-1.

The detection processing unit 9 performs the above processing to the 0-th row and M-th column (M is a positive integer) of the primary mask table. The detection processing unit 9 further performs the similar processing as that in "0" of the primary alarm component 5A in "1" to "N" (N is a positive integer) of the primary alarm component 5A. The detection processing unit 9 thus generates the value indicating the presence or absence of the occurrence of the alarm signal as the item name 5B.

The mask processing unit 10 generates the defined alarm information based on the primary masked alarm information and the secondary mask table, and stores the defined alarm information in the defined alarm information storing unit 7.

More specifically, the mask processing unit 10 generates the value indicating the presence or absence of the occurrence of each alarm signal based on the primary masked alarm information and the secondary mask table, and stores the generated value in the defined alarm information storing unit 7 as the item name 7B. For example, the mask processing unit 10 generates "1" as the item name 7B of the defined alarm component 7A indicating the alarm signal upon judgment that the alarm signal is occurred. Further, the mask processing unit 10 generates "0" as the item name 7B of the defined alarm component 7A indicating the alarm signal upon judgment that the alarm signal is not occurred.

More specifically, the mask processing unit 10 firstly stores the value of the item name 5B of "0" of the primary alarm component 5A of the primary masked alarm information in the defined alarm information storing unit 7 as the item name 7B of "0" of the defined alarm component 7A (hereinafter referred to as cALM-1).

Next, the mask processing unit 10 calculates AND condition between the value of the 0-th row and 0-th column in the secondary mask table and the value of the item name 5B of "0" of the primary alarm component 5A of the primary masked alarm information.

Next, the mask processing unit 10 calculates AND condition between the negative of the AND condition and the value of cALM-1, and stores the result in cALM-1.

Next, the mask processing unit 10 calculates AND condition between the value of the 0-th row and 1-th column in the secondary mask table and the value of the item name 5B of "1" of the primary alarm component 5A of the primary masked alarm information.

Next, the mask processing unit 10 calculates AND condition between the negative of the AND condition and the value of cALM-1, and stores the result in cALM-1.

The mask processing unit 10 performs the processing to the 0-th row and L-th column (L is a positive integer) in the secondary mask table. Further, the mask processing unit 10 performs the similar processing as that in "0" of the defined alarm component 7A in "1" to "N" (N is a positive integer) of the defined alarm component 7A. The mask processing 10 thus generates the value indicating the presence or absence of the occurrence of the alarm signal as the item name 7B.

Figure 10:
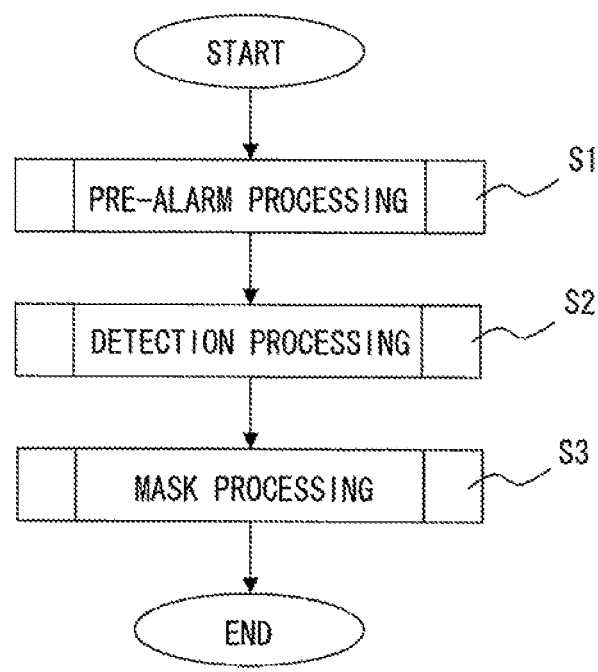
FIG. 10 is a flow chart showing one example of an alarm processing method in the alarm processing circuit according to the present invention.

Next, one example of the alarm processing method in the alarm processing circuit 100 according to the first exemplary embodiment will be described with reference to a flow chart shown in FIG. 10.

First, the pre-alarm processing unit 8 generates the alarm source information based on the main signal information, and stores the alarm source information in the alarm source information storing unit 3 (step S1; pre-alarm processing (primary mask processing)). In step S1, the pre-alarm processing unit 8 also generates the alarm source information regarding the alarm signal detected by other detection processing, and stores this alarm source information in the alarm source information storing unit 3.

Next, the detection processing unit 9 generates the primary masked alarm information based on the alarm source information, the mask setting information, and the primary mask table, and stores the primary masked alarm information in the primary masked alarm information storing unit 5 (step S2; detection processing (primary mask processing)).

Next, the mask processing unit 10 generates the defined alarm information based on the primary masked alarm information and the secondary mask table, and stores the defined alarm information in the defined alarm information storing unit 7 (step S3; mask processing (secondary mask processing)).

Figure 11:
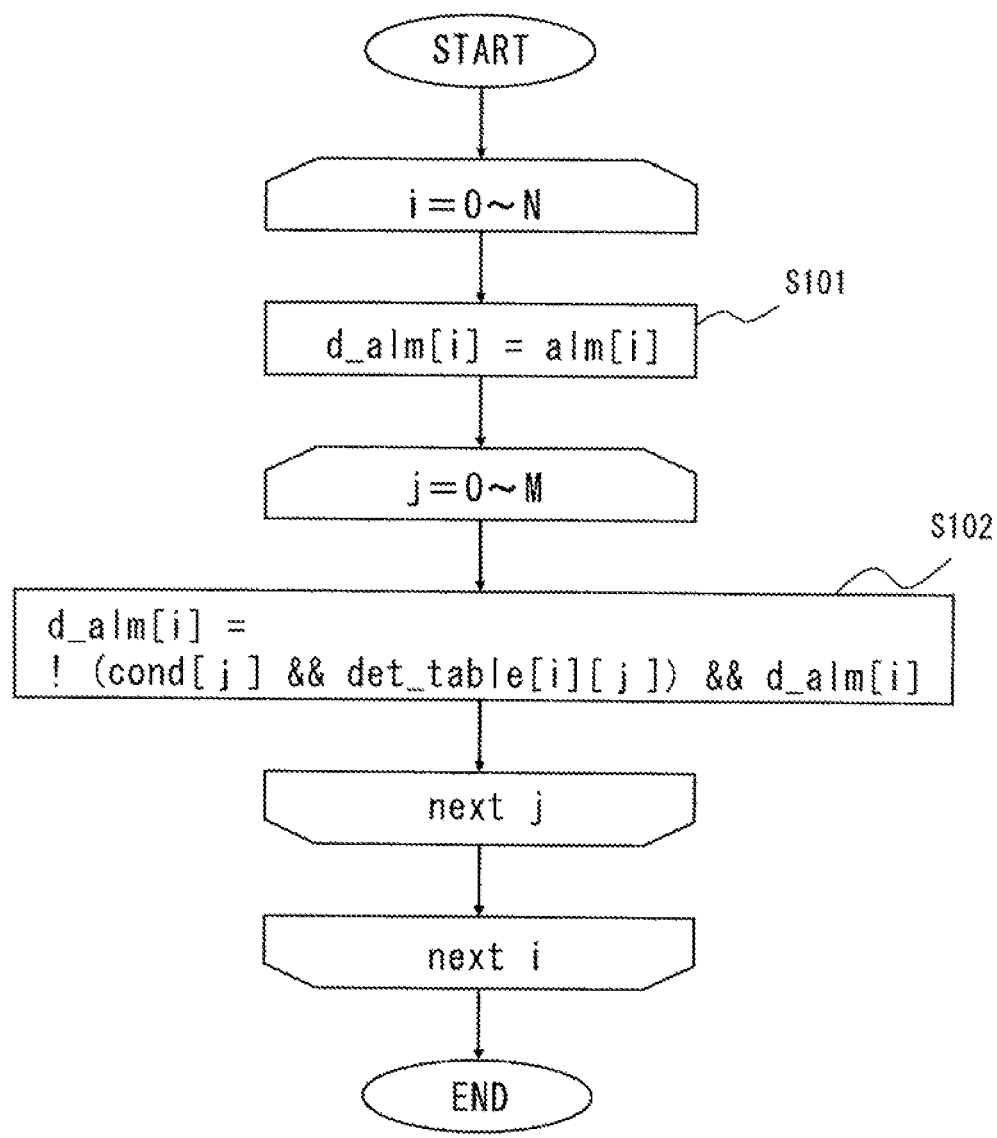
FIG. 11 is a flow chart showing one example of detection processing in the alarm processing method according to the present invention.

Now, the detail of the detection processing of step S2 will be described with reference to a flow chart shown in FIG. 11.

First, the detection processing unit 9 stores the generated value 3B of "i" of the alarm source component 3A of the alarm source information in the primary masked alarm information storing unit 5 as the item name 5B of "i" of the primary alarm component 5A (hereinafter referred to as dALM-i) (step S101; d_alm[i]=alm[i]). The detection processing unit 9 repeats the processing of step S101 until when i=N. Note that i is an integer from 0 to N.

Next, the detection processing unit 9 calculates AND condition (cond[j]&&det table[i][j]) between the value of the i-th row and j-th column in the primary mask table and the value 1B of "j" of the mask component 1A of the mask setting information.

Next, AND condition between the negative of the AND condition (!(cond[j]&&det table[i]W)) and the value of dALM-i is calculated (!(cond[j]&&det table[i][j])&&d_alm[i]), and the result is stored in dALM-i (step S102). The detection processing unit 9 repeats the processing of step S102 until when j=M. Note that j is an integer from 0 to M.

Figure 12:
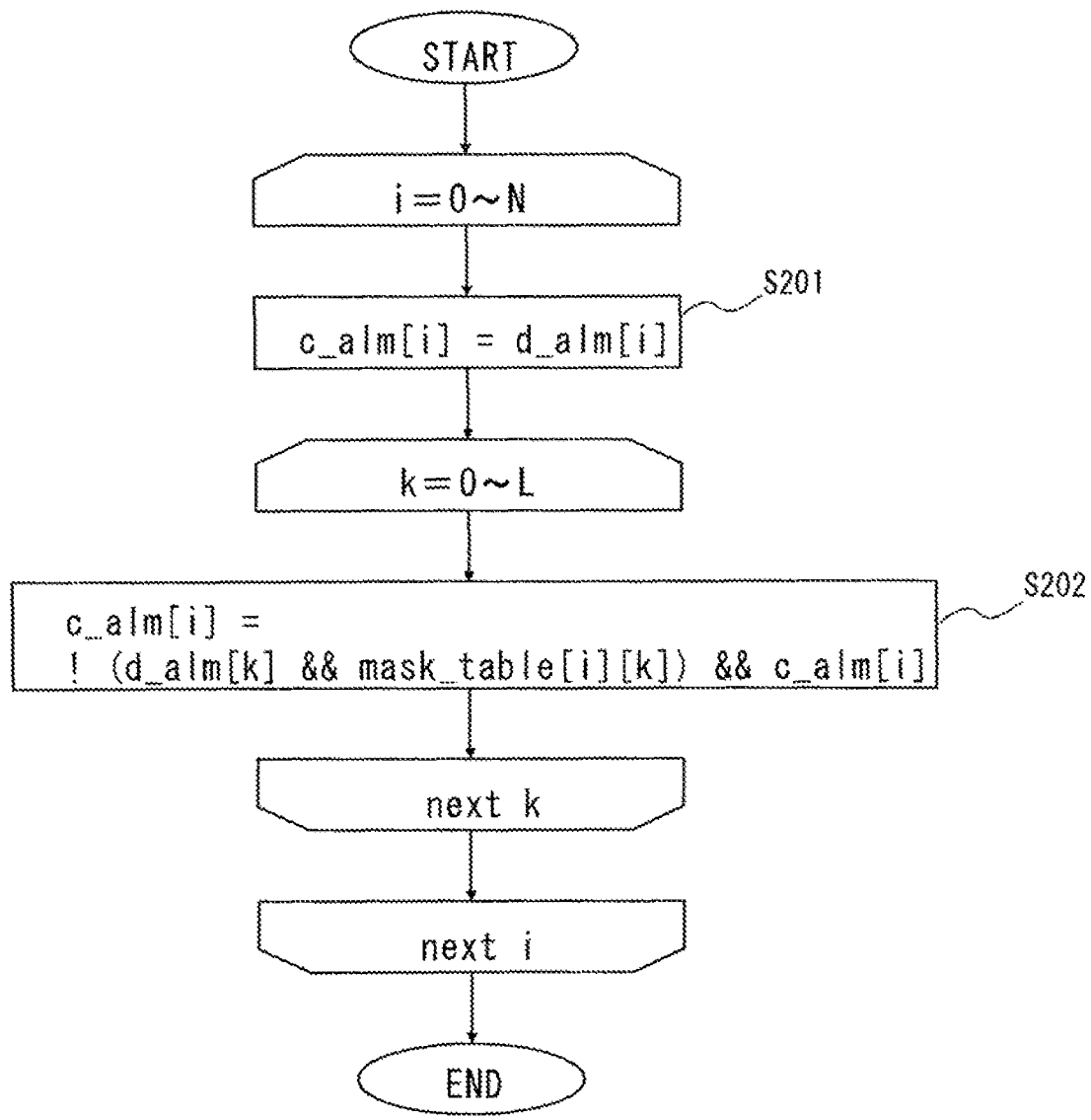
FIG. 12 is a flow chart showing one example of mask processing in the alarm processing method according to the first exemplary embodiment of the present invention.

Next, the detail of the mask processing of step S3 will be described with reference to a flow chart shown in FIG. 12.

First, the mask processing unit 10 stores the value of the item name 5B of "i" of the primary alarm component 5A of the primary masked alarm information in the defined alarm information storing unit 7 as the item name 7B of "i" of the defined alarm component 7A (hereinafter referred to as cALM-i) (step S201; c_alm[i]=d_alm[i]). The mask processing unit 10 repeats the processing of step S201 until when i=N. Note that i is an integer from 0 to N.

Next, the mask processing unit 10 calculates AND condition (d_alm[k]&&mask table[i][k]) between the value of the i-th row and k-th column in the secondary mask table and the item name 5B of "k" of the primary alarm component 5A of the primary masked alarm information.

Next, the AND condition between the negative of the AND condition (!(d_alm[k]&&mask table[i][k])) and the value of cALM-i is calculated (!(d_alm[k]&&mask table[i][k])&&c_alm[i]), and the result is stored in cALM-i (step S202). The mask processing unit 10 repeats the processing of step S202 until when k=L. Note that k is an integer from 0 to L.

In the first exemplary embodiment of the present invention described above, the alarm processing circuit 100 includes the primary mask processing unit 101 that performs the primary mask processing on the alarm signal based on the first condition (mask setting information, primary mask table), and the secondary mask processing unit 102 that performs the secondary mask processing on the alarm signal based on the second condition (secondary mask table) and the mask processing result (primary masked alarm information) by the primary mask processing unit 101.

Accordingly, it is possible to change the design by simply changing the first condition and the second condition. Thus, the change to the specification can be performed in a simpler way.

Further, the secondary mask processing based on the second condition is performed after performing the primary mask processing based on the first condition. Thus, it is possible to synchronize the process step of each alarm signal. As such, it is possible to solve the problem that the processing result varies according to the processing order of the alarm signal. Accordingly, it is possible to obtain more accurate processing result.

Further, the first condition includes the mask setting information and the primary mask table. The mask setting information indicates whether the alarm signal is subjected to the mask processing under the alarm mask condition which is determined as the setting of the device where the alarm processing circuit 100 is mounted. The primary mask table indicates whether each alarm signal is subjected to the mask processing under the alarm mask condition.

Accordingly, it is possible to perform the mask processing on the alarm signal in the primary mask processing in accordance with the setting of the device where the alarm processing circuit 100 is mounted.

Further, the change to the specification of the alarm processing circuit 100 can be performed by simply changing the mask setting information in accordance with the change to the specification of the device where the alarm processing circuit 100 is mounted.

Further, when the number of alarm signals is increased, the change to the specification of the alarm processing circuit 100 may be performed by just adding the alarm signal to the primary mask table.

Further, the second condition includes the secondary mask table indicating whether each alarm signal is subjected to the mask processing by other alarm signals.

Accordingly, it is possible to perform the mask processing of the secondary alarm signal due to the cause alarm signal in the secondary mask processing.

Further, when the number of alarm signals is increased, it is possible to perform the change to the specification of the alarm processing circuit 100 by just adding the alarm signal to the secondary mask table.

Further, the primary mask processing unit 101 includes the pre-alarm processing unit 8 that generates the alarm source information which is the source of the alarm signal based on the main signal information indicating the information in the device where the alarm processing circuit 100 is mounted and the main signal state.

In order to generate the alarm signal, the required processing needs to be defined for each device where the alarm processing circuit 100 is mounted. However, in the first exemplary embodiment, the alarm source information which is the source of the alarm signal is generated based on the main signal information indicating the information in the device where the alarm processing circuit 100 is mounted and the main signal state. Thus, the processing required for generating the alarm signal that is defined for each device is performed only by the processing by the pre-alarm processing unit 8. Thus, there is no need to perform the processing that is required to generate the alarm signal that is defined for each device in the following mask processing. Accordingly, the mask processing after the processing by the pre-alarm processing unit 8 can be made common regardless of the type of the device.

Further, the pre-alarm processing unit 8 further generates the alarm source information regarding the fault which is not based on the main signal information.

Accordingly, the alarm signal regarding the fault which is not based on the main signal information may be also treated in the alarm processing circuit 100.

Further, the primary mask processing unit 101 includes the detection processing unit 9 that generates the primary masked alarm information indicating the presence or absence of the occurrence of each alarm signal based on the primary mask table, the alarm source information, and the mask setting information.

Accordingly, it is possible to detect the presence or absence of the occurrence of each alarm signal based on the setting of the device where the alarm processing circuit 100 is mounted. In other words, it is possible to perform the mask processing (primary mask processing) of each alarm signal based on the setting of the device.

Further, the secondary mask processing unit 102 generates the defined alarm information that indicates the presence or absence of the occurrence of each alarm signal based on the primary masked alarm information and the secondary mask table.

Accordingly, it is possible to perform the mask processing of the secondary alarm signal by the cause alarm signal.

Further, the information regarding whether the alarm signal is subjected to the mask processing and the presence or absence of the occurrence of each alarm signal is represented by the bit value (value of data), and the processing in the detection processing unit 9 and the mask processing unit 10 is the calculation processing that calculates the bit value.

Accordingly, it is possible to speed up the alarm processing.

Further, the processing in the detection processing unit 9 and the mask processing unit 10 is the loop processing with no conditional branch.

Accordingly, it is possible to speed up the alarm processing.

Further, in the first exemplary embodiment, the common algorithm is applied to the detection processing in the detection processing unit 9 and the mask processing in the mask processing unit 10. Accordingly, it is possible to judge the presence or absence of the occurrence of all the alarm signals using the same algorithm in the detection processing by the detection processing unit 9 and the mask processing by the mask processing unit 10.

Second Exemplary Embodiment

An alarm processing circuit 200 according to the second exemplary embodiment of the present invention will be described with reference to FIG. 13. In the alarm processing circuit 200 according to the second exemplary embodiment, only the configuration of a secondary mask processing unit 202 and a defined alarm information storing unit 12 is different from that of the alarm processing circuit 100 in the first exemplary embodiment. Thus, the same components are denoted by the same reference symbols, and the description thereof will be omitted.

Figure 13:
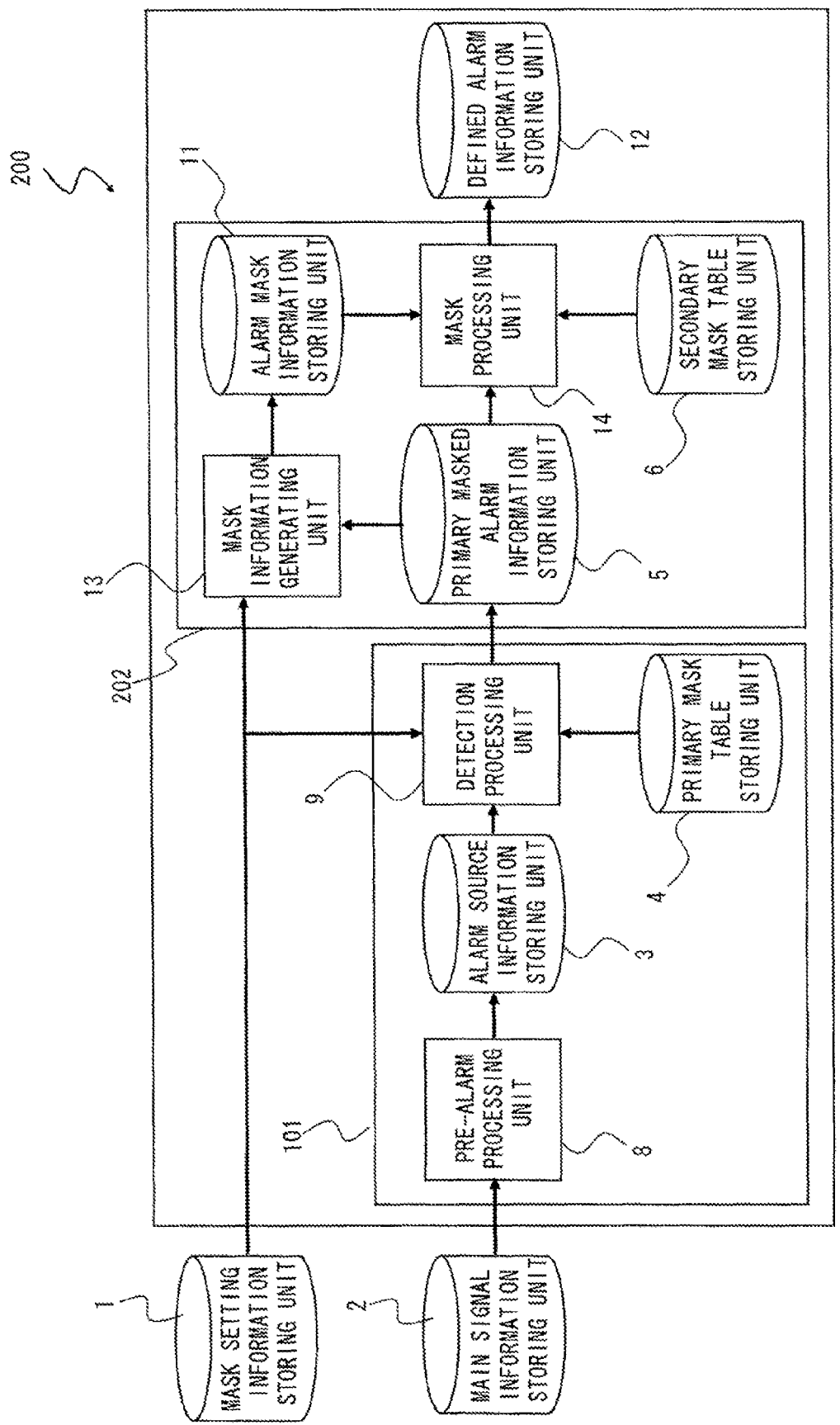
FIG. 13 is a block diagram showing one example of the alarm processing circuit according to a second exemplary embodiment of the present invention.

The alarm processing circuit 200 includes, as shown in FIG. 13, a primary mask processing unit 101, a secondary mask processing unit 202, and a defined alarm information storing unit 12.

The primary mask processing unit 101 mainly performs the primary mask processing of the alarm signal based on the first condition. Further, the secondary mask processing unit 202 mainly performs the secondary mask processing based on the second condition and the processing result of the primary mask processing unit 101.

In summary, in the second exemplary embodiment, the mask processing is separately performed as the primary mask processing and the secondary mask processing.

Now, the first condition includes the mask setting information and the primary mask table. Further, the second condition includes the alarm mask information that will be described below and the secondary mask information.

The secondary mask processing unit 202 includes a primary masked alarm information storing unit 5, a secondary mask table storing unit 6, an alarm mask information storing unit 11, a mask information generating unit 13, and a mask processing unit 14. The secondary mask processing of the secondary mask processing unit 202 includes the mask information generation processing by the mask information generating unit 13 and the mask processing by the mask processing unit 14.

Further, the detection processing unit 9 of the primary mask processing unit 101 and the primary masked alarm information storing unit 5 of the secondary mask processing unit 202 are connected. Further, the mask information generating unit 13 of the secondary mask processing unit 202 is connected to the mask setting information storing unit 1.

Further, the alarm processing circuit 200 includes a computer (not shown) or the like that includes a CPU (Central Processing Unit; not shown) or the like. The CPU executes a program for realizing various functions of the alarm processing circuit 200, so that various functions of the alarm processing circuit 200 are operated. More specifically, the CPU executes an alarm processing program so that it functions as the pre-alarm processing unit 8, the detection processing unit 9, the mask information generating unit 13, and the mask processing unit 14.

Further, the alarm processing circuit 200 includes a memory (not shown) or the like. The memory functions as the alarm source information storing unit 3, the primary mask table storing unit 4, the primary masked alarm information storing unit 5, the secondary mask table storing unit 6, the alarm mask information storing unit 11, and the defined alarm information storing unit 12.

Note that the alarm processing circuit 200 may be formed by a rewritable FPGA (Field Programmable Logic Device).

The alarm mask information storing unit 11 stores the alarm mask information. The alarm mask information is the information indicating whether the alarm signal that is generated after the primary mask processing is subjected to the mask processing in the alarm mask condition stored in the Mask setting information storing unit 1. FIG. 14 shows the data structure of the alarm mask information. As shown in FIG. 14, the alarm mask information storing unit 11 stores the data format and the meaning/usage by making them correspondent to each other. Further, the alarm mask information storing unit 11 stores an alarm mask component 11A and a value 11B by making them correspondent to each other as the data format. The alarm mask information storing unit 11 further stores an item name 11C as the meaning/usage. In other words, the alarm mask information storing unit 11 stores the alarm mask component 11A, the value 11B, and the item name 11C by making them correspondent to each other.

Now, the item name 11C indicates the type of the alarm signal. Further, the value 11B indicates whether the corresponding alarm signal is subjected to the mask processing in the alarm mask condition. More specifically, the value 11B indicates the mask execution when the value 11B is "1", and indicates the mask non-execution when the value 11B is "0". The defined alarm information storing unit 12 stores the defined alarm information.

The defined alarm information is the information indicating the presence or absence of the occurrence of each alarm signal after the mask processing by the mask processing unit 14. FIG. 15 shows the data structure of the defined alarm information. As shown in FIG. 15, as the data structure of the defined alarm information according to the second exemplary embodiment is similar to that of the defined alarm information according to the first exemplary embodiment, the description is omitted.

The mask information generating unit 13 generates the alarm mask information based on the mask setting information stored in the mask setting information storing unit 1 and the primary masked alarm information stored in the primary masked alarm information storing unit 5, and stores the alarm mask information in the alarm mask information storing unit 11. Further, the mask information generating unit 13 executes processing which is set in advance for each type of the alarm signals, and generates the alarm mask information such as the value 11B and the item name 11C or the like for every alarm mask component 11A of the alarm mask information.

More specifically, the mask information generating unit 13 generates the item name 11C of the alarm mask information based on the item name 5B of the primary masked alarm information. Further, the mask information generating unit 13 generates the value 11B of the alarm mask information based on the value 1B of the mask setting information and the value of the item name 5B of the primary masked alarm information.

The mask processing unit 14 generates the defined alarm information based on the primary masked alarm information, the alarm mask information, and the secondary mask table, and stores the defined alarm information in the defined alarm information storing unit 12.

More specifically, the mask processing unit 14 generates the value indicating presence or absence of the occurrence of each alarm signal based on the primary masked alarm information, the alarm mask information, and the secondary mask table, and stores the generated value in the defined alarm information storing unit 12 as an item name 12B. For example, the mask processing unit 14 generates "1" as the item name 12B of a defined alarm component 12A indicating the alarm signal upon judgment that the alarm signal is occurred. Further, the mask processing unit 14 generates "0" as the item name 12B of the defined alarm component 12A indicating the alarm signal when it is judged that the alarm signal is not occurred.

More specifically, the mask processing unit 14 firstly stores the value of the item name 5B of "0" of the primary alarm component 5A of the primary masked alarm information in the defined alarm information storing unit 12 as the item name 12B (hereinafter referred to as cALM-1) of "0" of the defined alarm component 12A.

Next, the mask processing unit 14 calculates AND condition between the value of the 0-th row and 0-th column in the secondary mask table and the value 11B of "0" of the alarm mask component 11A of the alarm mask information.

Next, the mask processing unit 14 calculates AND condition between the negative of the AND condition and the value of cALM-1, and stores the result in cALM-1.

Next, the mask processing unit 14 calculates AND condition between the value of the 0-th row and 1-th column in the secondary mask table and the value 11B of "1" of the alarm mask component 11A of the alarm mask information.

Next, the mask processing unit 14 calculates AND condition between the negative of the AND condition and the value of cALM-1, and stores the result in cALM-1.

The mask processing unit 14 performs the above processing to the 0-th row and L-th column (L is a positive integer) in the secondary mask table. Further, the mask processing unit 14 performs the similar processing as that in "0" of the defined alarm component 12A in "1" to "N" (N is a positive integer) of the defined alarm component 12A. The mask processing unit 14 thus generates the value indicating the presence or absence of the occurrence of the alarm signal as the item name 12B.

Figure 16:
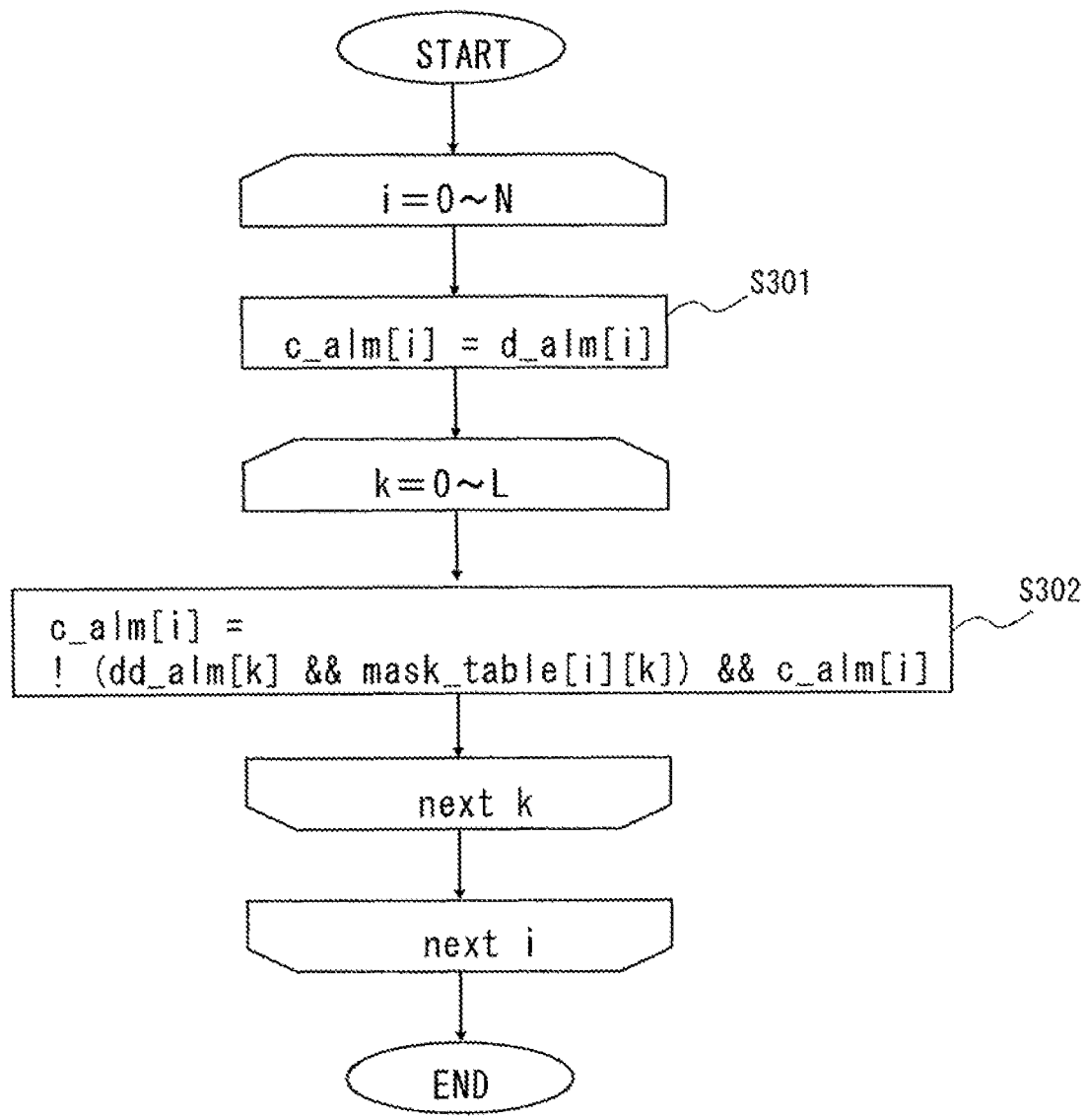
FIG. 16 is a flow chart showing one example of mask processing in an alarm processing method according to the second exemplary embodiment of the present invention.

Next, one example of the alarm processing method in the alarm processing circuit 200 according to the second exemplary embodiment will be described. As the flow of the alarm processing method in the alarm processing circuit 200 according to the second exemplary embodiment is similar to FIG. 10, the description will be omitted. Further, as the detection processing in the alarm processing circuit 200 according to the second exemplary embodiment is similar to FIG. 11, the description will be omitted. Hereinafter, the detailed description of the mask processing of step S3 shown in FIG. 10 in the alarm processing circuit 200 will be described with reference to a flow chart shown in FIG. 16.

First, the mask processing unit 14 stores the value of the item name 5B of "i" of the primary alarm component 5A of the primary masked alarm information in the defined alarm information storing unit 12 as the item name 12B (hereinafter referred to as cALM-i) of "i" of the defined alarm component 12A (step S301; c_alm[i]=d_alm[i]). The mask processing unit 14 repeats the processing of step S301 until when i=N, where i is an integer from 0 to N.

Next, the mask processing unit 14 calculates AND condition (dd_alm[k]&&mask table[i][k]) between the value of the i-th row and k-th column in the secondary mask table and the item name 11B of "k" of the alarm mask component 11A of the alarm mask information.

Next, AND condition between the negative of the AND condition (!(dd_alm[k]&&mask table[i][k])) and the value of cALM-i is calculated (!(dd_alm[k]&&mask table[i][k])&&c_alm[i]), and the result is stored in cALM-i (step S302). The mask processing unit 14 repeats the processing of step S302 until when k=L. Note that k is an integer from 0 to L.

Needless to say, the alarm processing circuit 200 and the alarm processing method according to the second exemplary embodiment of the present invention discussed above realize the similar advantage as the alarm processing circuit 100 and the alarm processing method according to the first exemplary embodiment. Further, in the second exemplary embodiment, the second condition includes the alarm mask information indicating whether the alarm signal that is generated after the primary mask processing is subjected to the mask processing under the alarm mask condition. Furthermore, the mask processing unit 14 generates the defined alarm information indicating the presence or absence of the occurrence of each alarm signal based on the primary masked alarm information, the secondary mask table, and the alarm mask information.

Accordingly, it is possible to perform the mask processing on the alarm signal in accordance with the setting of the device in which the alarm processing circuit 200 is mounted also in the secondary mask processing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:
1. An alarm processing circuit comprising:
a primary mask processing unit that performs primary mask processing on an alarm signal based on a first condition; and
a secondary mask processing unit that performs secondary mask processing on the alarm signal based on a second condition and a mask processing result by the primary mask processing unit, the second condition being different from the first condition, wherein the first condition comprises:

mask setting information that indicates whether the alarm signal is subjected to mask processing in an alarm mask condition, the alarm mask condition being defined as setting of a device in which the alarm processing circuit is mounted, and a primary mask table that indicates whether each alarm signal is subjected to the mask processing in the alarm mask condition.

2. The alarm processing circuit according to claim 1, wherein the second condition comprises a secondary mask table that indicates whether each alarm signal is subjected to the mask processing by other alarm signals.

3. The alarm processing circuit according to claim 1, wherein the primary mask processing unit comprises a pre-alarm processing unit generating alarm source information based on information in a device where the alarm processing circuit is mounted and main signal information indicating main signal state, the alarm source information being a source of the alarm signal.

4. The alarm processing circuit according to claim 3, wherein the pre-alarm processing unit further generates alarm source information regarding a fault which is not based on the main signal information.

5. The alarm processing circuit according to claim 3, wherein the primary mask processing unit comprises a detection processing unit that generates primary masked alarm information based on a primary mask table that indicates whether each alarm signal is subjected to the mask processing in the alarm mask condition, the alarm source information, and mask setting information that indicates whether the alarm signal is subjected to mask processing in an alarm mask condition, the alarm mask condition being defined as setting of a device in which the alarm processing circuit is mounted, the primary masked alarm information indicating presence or absence of occurrence of each alarm signal.

6. The alarm processing circuit according to claim 5, wherein the secondary mask processing unit comprises a mask processing unit that generates defined alarm information based on the primary masked alarm information and a secondary mask table that indicates whether each alarm signal is subjected to the mask processing by other alarm signals, the defined alarm information indicating the presence or absence of the occurrence of each alarm signal.

7. The alarm processing circuit according to claim 6, wherein the second condition comprises alarm mask information that indicates whether the alarm signal that is occurred after the primary mask processing is subjected to the mask processing under the alarm mask condition, and the mask processing unit generates defined alarm information based on the primary masked alarm information, the secondary mask table, and the alarm mask information, the defined alarm information indicating the presence or absence of the occurrence of each alarm signal.

8. The alarm processing circuit according to claim 6, wherein information indicating whether the alarm signal is subjected to the mask processing and the presence or absence of the occurrence of each alarm signal is represented by a value of data, and processing in the detection processing unit and the mask processing unit is calculation processing that calculates the value of the data.

9. The alarm processing circuit according to claim 6, wherein the processing in the detection processing unit and the mask processing unit is loop processing with no conditional branch.

10. An alarm processing method comprising:

performing primary mask processing on an alarm signal based on a first condition; and performing secondary mask processing on the alarm signal based on a second condition and a mask processing result by the primary mask processing, the second condition being different from the first condition, wherein the first condition comprises:

mask setting information that indicates whether the alarm signal is subjected to mask processing in an alarm mask condition, the alarm mask condition being defined as setting of a device in which the alarm processing circuit is mounted, and a primary mask table that indicates whether each alarm signal is subjected to the mask processing in the alarm mask condition.

11. The alarm processing method according to claim 10, wherein the second condition comprises a secondary mask table that indicates whether each alarm signal is subjected to the mask processing by other alarm signals.

12. The alarm processing method according to claim 10, wherein the primary mask processing comprises pre-alarm processing generating alarm source information based on information in a device where the alarm processing circuit is mounted and main signal information indicating main signal state, the alarm source information being a source of the alarm signal.

13. The alarm processing method according to claim 12, wherein alarm source information regarding a fault which is not based on the main signal information is further generated in the pre-alarm processing.

14. The alarm processing method according to claim 12, wherein the primary mask processing comprises detection processing that generates primary masked alarm information based on a primary mask table that indicates whether each alarm signal is subjected to the mask processing in the alarm mask condition, the alarm source information, and mask setting information that indicates whether the alarm signal is subjected to mask processing in an alarm mask condition, the alarm mask condition being defined as setting of a device in which the alarm processing circuit is mounted, the primary masked alarm information indicating presence or absence of occurrence of each alarm signal.

15. The alarm processing method according to claim 14, wherein the secondary mask processing comprises mask processing that generates defined alarm information based on the primary masked alarm information and a secondary mask table that indicates whether each alarm signal is subjected to the mask processing by other alarm signals, the defined alarm information indicating the presence or absence of the occurrence of each alarm signal.

16. The alarm processing method according to claim 15, wherein the second condition comprises alarm mask information that indicates whether the alarm signal that is occurred after the primary mask processing is subjected to the mask processing under the alarm mask condition, and defined alarm information is generated in the mask processing based on the primary masked alarm information, the secondary mask table, and the alarm mask information, the defined alarm information indicating the presence or absence of the occurrence of each alarm signal.

17. The alarm processing method according to claim 15, wherein
- information indicating whether the alarm signal is subjected to the mask processing and the presence or absence of the occurrence of each alarm signal is represented by a value of data, and
- the detection processing and the mask processing are calculation processing that calculates the value of the data.

18. The alarm processing method according to claim 15, wherein the detection processing and the mask processing are loop processing with no conditional branch.

* * * * *